March 1, 1966 G. WEIGELE ETAL 3,237,229
CAR WASHING PLANT
Filed July 6, 1964 3 Sheets-Sheet 1

INVENTORS
GEBHARD WEIGELE
BY JOHANN SULZBERGER
Woodhams, Blanchard & Flynn
ATTORNEYS March 1, 1966 G. WEIGELE ETAL 3,237,229
CAR WASHING PLANT
Filed July 6, 1964 3 Sheets-Sheet 2
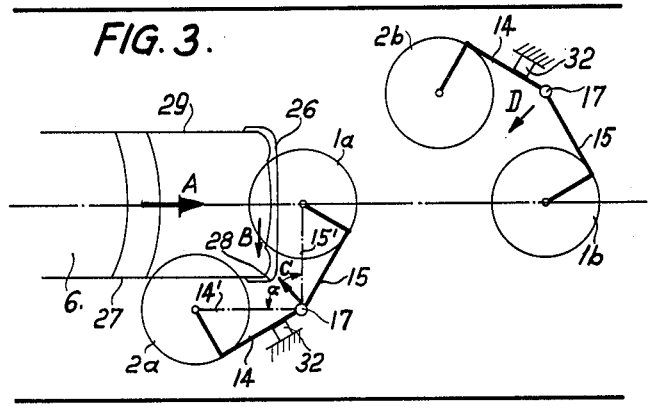
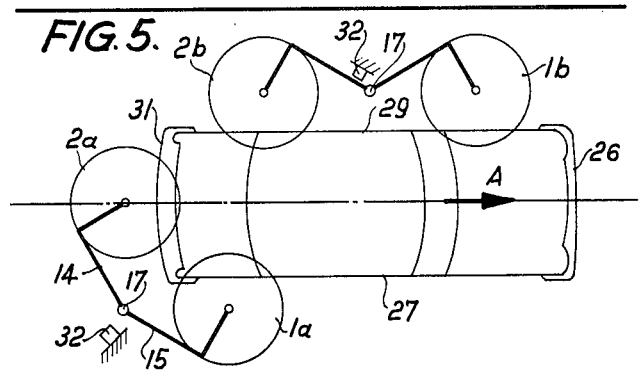
INVENTORS
GEBHARD WEIGELE
BY JOHANN SULZBERGER
ATTORNEYS March 1, 1966  G. WEIGELE ETAL  3,237,229
CAR WASHING PLANT
Filed July 6, 1964  3 Sheets-Sheet 3
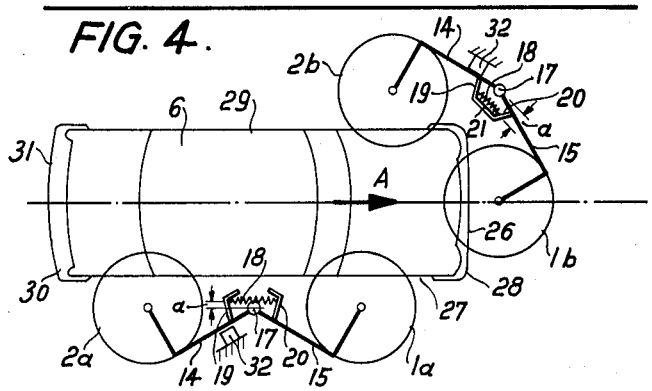
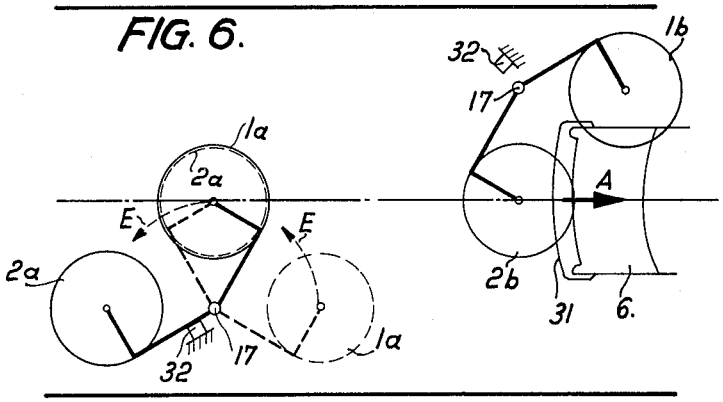
INVENTORS
GEBHARD WEIGELE
BY JOHANN SULZBERGER
Woodhams, Blanchard and Flynn
ATTORNEYS United States Patent Office 3,237,229
Patented Mar. 1, 1966

3,237,229
CAR WASHING PLANT
Gebhard Weigele, Holzweg 75, Augsburg, Germany, and Johann Sulzberger, Mozart Str. 17, Steppach, near Augsburg, Germany
Filed July 6, 1964, Ser. No. 380,571
Claims priority, application Germany, Apr. 9, 1964, W 36,535
6 Claims. (Cl. 15—21)

The invention relates to an automatic washing plant for vehicles that pass through the plant, in particular private cars, the plant including rotary brushes mounted on pivotal arms at fixed positions, the brushes including a horizontal brush for cleaning the upper part of the vehicle, and two vertical brushes on each side relative to the direction in which the vehicle passes through the plant, each of said two brushes being displaced in the said direction and the arrangement of the brushes being such that of each of the said two brushes one of them which is spring controlled first cleans half the front and then one side of the vehicle, while the other brush serves to clean one side of the vehicle and half the back of the vehicle.

In a known washing plant of this type the pivotal arms of the two vertical brushes are pivotally mounted at points a considerable distance apart, the second brush that serves to clean the back of the vehicle needing to be controlled by means of a hydraulic ram actuating the pivotal arm of this brush. An operator is needed to control this ram, and the work of controlling it is made more difficult due to the two brushes serving to clean the back of the vehicle being displaced relatively to one another.

The object of the present invention is to improve washing plants of the above type both in construction and in operation, and to provide a fully automatic washing plant that does away with the need for an operator to control it. With this object, the pivotal arms of each two vertical brushes are pivotal about a common fixed vertical axis, and the two pivotal arms are connected by resilient means and provided with stops on which they abut under the action of the said resilient means, with an angle of approximately 90° of their effective lever arms, the brush assembly freely pivotal about the vertical axis being held in an initial position in which the first brush is located at the center of the front of the vehicle and the second brush at the side of a wing or mudguard, so that with a vehicle passing through the plant both brushes are continuously pressed against the vehicle by the same resilient means acting on them both, in such manner that initially the first brush cleans the front of the vehicle and the second brush one side, then both brushes clean one side and finally the second brush cleans the back and the first brush one side.

This new automatic washing plant is characterised by an extremely simple construction and fully automatic operation. All of the washing brushes of the plant are controlled by the vehicle itself as it passes through the plant, so that electrical, hydraulic or pneumatic control elements are obviated and furthermore an operator is not required for the new washing plant.

Details and further advantages of the automatic washing plant according to the invention will now be described in relation to the embodiment of the invention shown by way of example in the accompanying drawings, in which:

FIGS. 3 to 6 show in plan view the various operations that take place for different positions of a vehicle passing through the plant.

Figure 1:
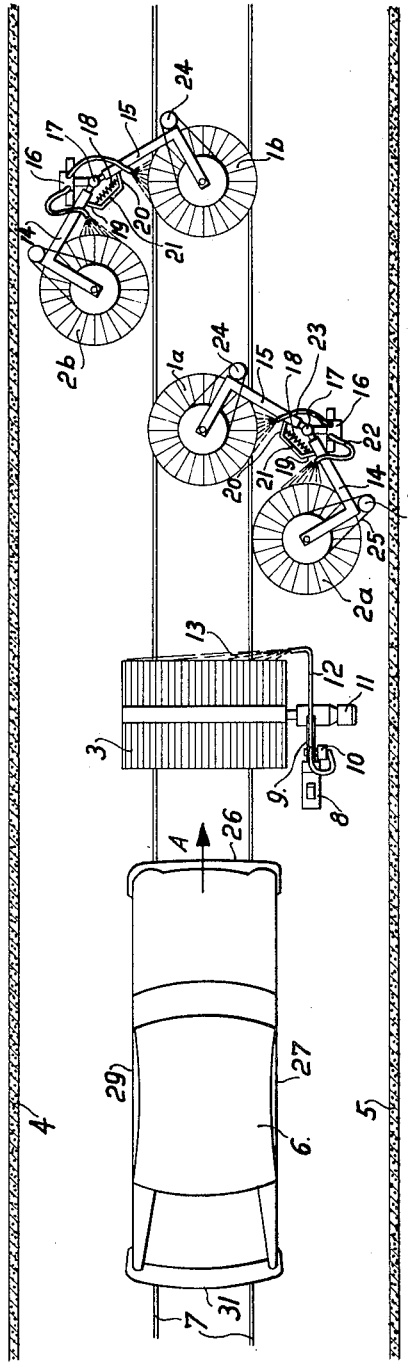
FIG. 1 is a plan view of an automatic washing plant according to the invention.
Figure 2:
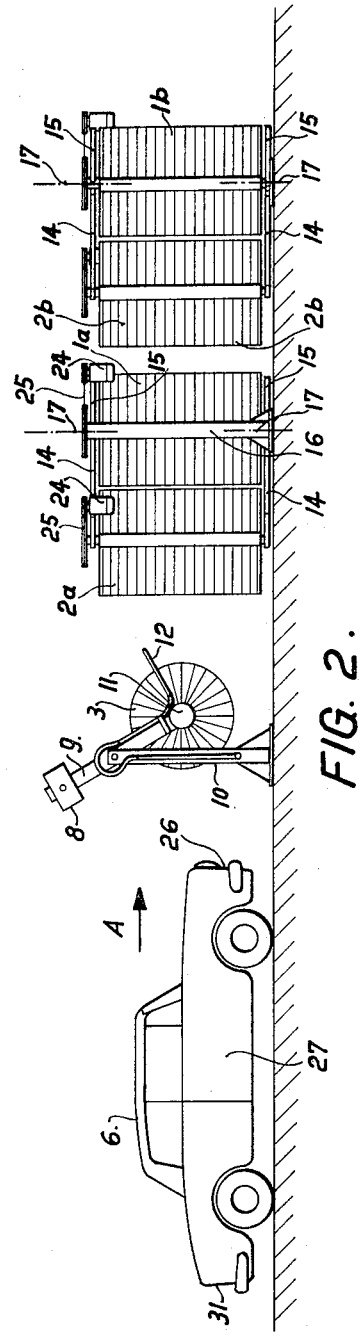
FIG. 2 is a side view of the plant.

In the washing plant illustrated, there are in all five rotary washing brushes viz two assemblies comprising two brushes 1a, 2a and 1b, 2b and a horizontal brush 3. The lateral walls of the washing plant are indicated at 4 and 5 and a vehicle to be cleaned is indicated at 6. This vehicle runs through the plant in the direction of the arrow A at a suitably low speed, the vehicle being pulled through the plant or driven through by means of its own engine. In this case guide rails 7 are preferably provided for keeping the wheels of the vehicle substantially central relative to the plant as the vehicle passes through.

As the vehicle passes through, the top of the car 6 is first washed by the horizontal brush 3. This brush 3 is mounted on a stationary stand 10 via a pivotal arm 9 loaded with a counterweight 8, and is driven by means of an electric motor 11. Washing liquid is continuously supplied to the brush 3 through a pipe 12, as shown at 13 in FIG. 1.

The two brush assemblies 1a, 2a and 1b, 2b are of similar construction. The construction of only one of the assemblies will therefore be described. As can be seen from the drawings, the two pivotal arms 14 and 15 which are preferably curved or angular and which carry the vertical brushes 2a and 1a, are pivotally mounted on a stationary column 16 to pivot about a common vertical axis 17. These two pivotal arms 14 and 15 are connected together by a spring 18 and comprise angled stops 19, 20 by which they mutually abut at 21 under the action of the spring 18, with their effective lever arms 14' and 15' including an angle α of approximately 90° as shown in FIG. 3 by the dot-dash lines. Washing liquid is also supplied to these vertical brushes 1a and 2a in known manner, by means of the pipes shown at 22 and 23.

The above described brush assembly which is freely pivotal about the vertical axis 17 is shown in FIGS. 1 and 3 as held in an initial position in which the first brush 1a is located at the center of the front of the vehicle 6 and the second brush 2a is located at the side of a wing.

The two brushes 1a and 2a are driven respectively by electric motors 24 arranged on the pivotal arms 14 and 15, via belt drives 25.

As can also be seen from the drawings, the tension spring 18 interconnecting the two pivotal arms 14 and 15 is advantageously so arranged on the angular stops 19, 20 that with the pivotal arms opening the lever arm a of the spring becomes smaller, as shown in FIG. 4, so that the couple exerted by the spring on the pivotal arms 14, 15 remains substantially constant having regard to the increase in the tension of the spring as it is extended.

The operation of the washing plant is as follows:

The vehicle passing through the plant meets the first brush assembly 1a, 2a in its initial position as shown in FIG. 3. In this position, the first brush 1a is approximately at the center of the front 26 of the vehicle and the second brush 2a is at the right hand side 27 of the vehicle in the region of the wing. Upon further movement of the vehicle 6 the brush 1a is pressed in the direction A by the vehicle itself, thereby swinging the pivotal arm 15 about the axis 17. The brush 2a is thereby pressed laterally against the vehicle under the action of the spring 18.

The brush 1a moves over the front of the vehicle 26 outwardly in the direction B and around the corner 28 of the vehicle, so that eventually both brushes 1a and 2a operate on the side 27 of the vehicle as shown in FIG.

4. Since the pivotal arms of the two brushes are interconnected by the spring 18, the two brushes are caused to bear on the vehicle with the same pressure. In the position shown in FIG. 4 the second brush assembly 1b, 2b, which is displaced relative to the first assembly, comes into action in the same manner as the brush assembly 1a, 2a as shown in FIG. 3. Upon further movement of the vehicle, a position is reached as shown in FIG. 5, in which the second brush assembly 1b, 2b washes the side 29 of the vehicle, while the second brush 2a of the other brush assembly moves around the rear corner 30 of the vehicle, is pressed by spring action against the back 31 of the vehicle and finally reaches the end position shown in FIG. 5. Upon further movement of the vehicle 6 the brushes 2b and 1b also reach the above described end position (FIG. 6). When the vehicle has also left this second brush assembly the two brush assemblies are automatically turned back again into the initial positions shown in FIGS. 1 and 3. This return of the assemblies into their initial positions can be brought about in a very simple manner by inclining the vertical axes 17 of both assemblies upwardly in the directions C and D respectively so that they swing back automatically into their initial positions under the action of their own weight. If desired this swinging back of the brush assemblies into their initial positions may be brought about by other means e.g. by spring action or by means of a tension cord loaded by a weight. In FIG. 6 the brush assembly 1a, 2a is shown by broken lines in the end position shown in FIG. 5, and in its initial position by full lines, the automatic swinging back of the assembly into the initial position being indicated by arrows E.

In order to secure or hold each brush assembly in its initial position, a stationary stop 32 may advantageously be provided for each assembly as shown, the stop holding the pivotal arm 14 of the second brush in the initial position. During a further washing operation in accordance with FIGS. 4 and 5 however, the pivotal arm 14 is removed from the stop 32, so that during the whole washing operation the two brushes 1a, 2a and 1b, 2b are pressed against the vehicle only by the action of their respective tension springs 18.

We claim:

1. Automatic plant comprising rotary brushes for washing a vehicle passing through the plant, the plant including at least one arm mounted for pivotal movement about a horizontal axis, and a brush, carried by said arm for rotation about a horizontal axis, for cleaning the top of the vehicle, and two rotary brush assemblies arranged to be encountered successively by the vehicle, each said assembly comprising two arms mounted for pivotal movement about a common vertical axis, means urging said arms towards one another, and means for limiting the movement of said arms towards one another such that the minimum angle included between their effective lever arms is approximately 90°, a brush carried by each said arm for rotation about a vertical axis, and means defining an initial position of each said assembly in which position one brush of each assembly is initially presented to about the center of the front of the vehicle and the other brush to a wing, passage of a vehicle through the plant resulting in said one brush moving outwardly across the front of the vehicle and passing round a front corner of the vehicle while the other brush passes along the side of the vehicle, then both said brushes passing along the said side, and finally said other brush passing over half the back of the vehicle while said one brush alone passes along the side, the said assemblies being arranged on respective sides of the center line of the path of the vehicle through the plant so as to clean respectively half fronts, sides and half backs of the vehicle, and being arranged, in the direction of movement of the vehicle, so that the one brush of one assembly is encountered by the vehicle before the one brush of the other assembly.

2. Automatic plant according to claim 1 wherein the said pivotal arms mounted on a common vertical axis are of angular form.

3. Automatic plant according to claim 1 wherein the said means urging said arms towards one another is a tension spring arranged so that its effective lever arm releases as the arms open, whereby the couple exerted by the spring on said arms remains substantially constant.

4. Automatic plant according to claim 1, including arrangements for urgingly returning each said assembly to its said initial position.

5. Automatic plant according to claim 4 wherein the said arrangements include the inclined mounting of the vertical axis of each assembly so that the assembly tends to return to the said initial position under its own weight.

6. Automatic plant according to claim 1 including a fixed stop associated with each of said assemblies, for releasably holding the arm on which said other brush of the assembly is mounted in a position coresponding to the said initial position of the assembly.

References Cited by the Examiner

UNITED STATES PATENTS 2,579,866   12/1951   Rousseau _____ 15—21

FOREIGN PATENTS 1,288,528   2/1962   France.

CHARLES A. WILLMUTH, *Primary Examiner.*